United States Patent
Hosoda et al.

(10) Patent No.: US 6,890,988 B2
(45) Date of Patent: May 10, 2005

(54) AROMATIC POLYESTER

(75) Inventors: Tomoya Hosoda, Ibaraki (JP); Hiroshi Harada, Nishitokyo (JP); Satoshi Okamoto, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 14 days.

(21) Appl. No.: 10/372,301

(22) Filed: Feb. 25, 2003

(65) Prior Publication Data

US 2003/0199627 A1 Oct. 23, 2003

(30) Foreign Application Priority Data

Feb. 27, 2002 (JP) ........................................ 2002-051035

(51) Int. Cl.$^7$ ........................ C08L 5/3477; C08G 64/00
(52) U.S. Cl. ........................ 524/720; 528/190; 528/193; 528/194; 528/198; 528/199; 528/206; 528/212; 525/437; 525/444; 524/442; 524/720
(58) Field of Search ................................ 528/190, 193, 528/194, 198, 206, 212; 525/437, 444; 524/442, 720

(56) References Cited

U.S. PATENT DOCUMENTS

| | | |
|---|---|---|
| 5,710,237 A | 1/1998 | Waggoner et al. |
| 5,969,083 A | 10/1999 | Long et al. |
| 6,121,369 A | 9/2000 | Stack et al. |
| 2002/0055607 A1 | 5/2002 | Okamoto et al. |

FOREIGN PATENT DOCUMENTS

WO  WO 97/45469  12/1997

Primary Examiner—Samuel A. Acquah
(74) Attorney, Agent, or Firm—Sughrue Mion, PLLC

(57) ABSTRACT

The present invention provides an aromatic polyester which is obtained by condensation polymerization reaction of terephthalic acid, 2,6-naphthalenedicarboxylic acid and acylated product obtained by acylation of parahydroxybenzoic acid and hydroquinone with fatty acid anhydride, wherein said aromatic polyester satisfy the following conditions (A) to (D), and the acylation and/or the condensation polymerization reaction are conducted in the presence of heterocyclic organic compound containing at least two nitrogen atoms:

(A): Number of moles of a monomer unit derived from parahydroxybenzoic acid (UNIT (1)) is 54–62 moles per 100 moles of UNIT (1), a monomer unit derived from hydroquinone (UNIT (2)), a monomer unit derived from terephthalic acid (UNIT (3)) and a monomer unit derived from 2,6-naphthalenedicarboxylic acid (UNIT (4)) in total;

(B): Number of moles of UNIT (2) is 19–23 moles per 100 moles of UNIT (1), UNIT (2), UNIT (3) and UNIT (4) in total;

(C): The molar ratio of UNIT (3) and UNIT (4), which is represented by the following formula (I) is 0.23–0.35:

$$[(3)]/\{[(3)]+[(4)]\} \quad (I)$$

wherein [(3)] and [(4)] represent number of moles of respective UNIT (3) and UNIT (4);

(D): Total number of moles of UNIT (3) and UNIT (4) is 0.95–1.05 moles per one mole of UNIT (2).

6 Claims, No Drawings

AROMATIC POLYESTER

BACKGROUND OF THE INVENTION

1. Field of the Invention

The present invention relates to an aromatic polyester obtained from parahydroxybenzoic acid, hydroquinone, terephthalic acid and 2,6-naphthalenedicarboxylic acid.

2. Prior Art

Aromatic polyesters obtained by polymerization of (1) parahydroxybenzoic acid, (2) hydroquinone,(3) terephthalic acid and (4) 2,6-naphthalenedicarboxylic acid have been already known.

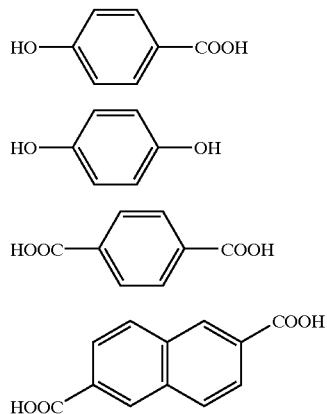

Specifically, U.S. Pat. No. 5,969,083 reports that when number of moles of monomer unit derived from (1) is 53.8 moles per 100 moles of the monomer units derived from (1) to (4) in total which constitute the aromatic polyester; and when the value which is represented by the following formula (I) is 0.2 or 0.4:

$$[(3)]/\{[(3)]+[(4)]\} \quad (I)$$

wherein [(3)] and [(4)] represent number of moles of the monomer unit derived from (3) and the monomer unit derived from (4),
the resulting aromatic polyester has a low melting point and low viscosity, and thus a molded article obtained therefrom exhibits a high heat distortion temperature (i.e., a deflection temperature under load) and excellent tensile elongation.

Further, Japanese laid open patent publication WO 97/45469 reports that when number of moles of monomer unit derived from (1) is 55.6 moles per 100 moles of the monomer units derived from (1) to (4) in total; and when the value represented by the formula (I) is 0.4, the resulting aromatic polyester has a low melting point, and thus a molded article obtained therefrom is excellent in tensile strength, tensile elongation, flexural strength and a modulus of flexural elasticity, and has a high heat distortion temperature (i.e., a deflection temperature under load).

The present inventors studied on aromatic polyesters containing monomer unit derived from (1) at 54–62 moles per 100 moles of the monomer units drived from (1) to (4) in total which constitute the aromatic polyester, and having the value represented by the formula (I) of 0.23–0.35, and revealed that the molded article obtained from the aromatic polyester has insufficient impact strength.

An object of the present invention is to provide an aromatic polyester which gives a molded article having excellent mechanical strength such as tensile, flexure and the like with excellent heat resistance such as a heat distortion temperature, and having excellent impact strength even with an aromatic polyester obtained from (1) parahydroxybenzoic acid, (2) hydroquinone,(3) terephthalic acid and (4) 2,6-naphthalenedicarboxylic acid, containing the monomer unit derived from (1) at 54–62 moles per 100 moles of the monomer units derived from (1) to (4) in total, and having the value represented by the aforementioned formula (I) of 0.23–0.35

SUMMARY OF THE INVENTION

The present invention relates to an aromatic polyester which is obtained by condensation polymerization reaction of terephthalic acid, 2,6-naphthalenedicarboxylic acid and acylated product obtained by acylation of parahydroxybenzoic acid and hydroquinone with fatty acid anhydride, wherein said aromatic polyester satisfy the following conditions (A) to (D), and the acylation and/or the condensation polymerization reaction are conducted in the presence of heterocyclic organic compound containing at least two nitrogen atoms.

(A): Number of moles of a monomer unit derived from parahydroxybenzoic acid (hereinafter referred to "UNIT (1)") is 54–62 moles per 100 moles of the unit (1), a monomer unit derived from hydroquinone (hereinafter referred to "UNIT (2)"), a monomer unit derived from terephthalic acid (hereinafter referred to "UNIT (3)") and a monomer unit derived from 2,6-naphthalenedicarboxylic acid (hereinafter referred to "UNIT (4)") in total.

(B): Number of moles of UNIT (2) is 19–23 moles per 100 moles of UNIT (1), UNIT (2), UNIT (3) and UNIT (4) (hereinafter referred to "UNITS (1–4)") in total.

(C): The molar ratio of UNIT (3) and UNIT (4), which is represented by the following formula (I) is 0.23–0.35:

$$[(3)]/\{[(3)]+[(4)]\} \quad (I)$$

wherein [(3)] and [(4)] represent number of moles of respective UNIT (3) and UNIT (4).

(D): Total number of moles of UNIT (3) and UNIT (4) is 0.95–1.05 moles per one mole of UNIT (2).

Hereinafter, the aromatic polyester defined above is referred to "the present polyester".

The present invention also relates to an aromatic polyester obtained by solid phase polymerization of the present polyester. Hereinafter, the aromatic polymer obtained by the solid phase polymerization is referred to "the present polyester (2)".

DETAILED DESCRIPTION OF PREFERRED EMBODIMENTS

The present invention is explained in detail below.

The content of UNIT (1) in the present polyester is from 54 to 62 moles, preferably from 55 to 60 moles of UNIT (1) per 100 moles of UNITS (1–4) in total which constitute the present polyester.

The content of UNIT (2) is from 19 to 23 moles, preferably from 20 to 22.5 moles per 100 moles of UNITS (1–4) in total which constitute the present polyester.

The content of UNIT (3) and UNIT (4) is from 0.95 to 1.05 moles, preferably from about 0.98 to about 1.02 moles, and particularly preferably from about 1.00 mole per 1 mole of UNIT (2) which constitute the present polyester.

When the molar ratio of UNIT (3) and UNIT (4) in the present polyester is represented by the following formula (I):

$$[(3)]/\{[(3)]+[(4)]\} \tag{I}$$

wherein [(3)] and [(4)] represent number of moles of respective UNIT (3) and UNIT (4) which constitute the present polyester, the ratio is from 0.23 to 0.35, preferably from 0.25 to 0.30.

As charged amount of a monomer as a raw material of polymer usually directly reflects the contents of the monomer unit derived from the material in the polymer, the content of UNIT (1), UNIT (2), UNIT (3) or UNIT (4) may be regarded as identical to the content of parahydroxybenzoic acid, hydroquinone, terephthalic acid or 2,6-naphthalenedicarboxylic acid used respectively, in the present invention.

The fatty acid anhydride used in producing the present polyester may include for example, acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride and the like. Two or more fatty acid anhydrides may be used.

Among the fatty acid anhydrides, acetic anhydride, propionic anhydride, butyric anhydride and isobutyric anhydride are preferred, and in particular, acetic anhydride is suitable.

The amount of the fatty acid anhydride to be used is usually from about 1.0 to about 1.25 equivalents, preferably from about 1.0 to about 1.2 equivalents, and particularly preferably from about 1.03 to about 1.15 equivalents per one equivalent in total of phenolic hydroxyl groups of parahydroxybenzoic acid and hydroquinone.

When the fatty acid anhydride is used at 1.0 equivalent or greater, it is preferred that sublimation of the raw monomer materials are likely to be suppressed during the condensation polymerization reaction. When the fatty acid anhydride is used at 1.25 equivalents or less, it is preferred that coloring of the resulting aromatic polyester is likely to be reduced.

The present polyester is aromatic polyester obtained by carrying out the reaction in the presence of a heterocyclic organic base compound containing two or more nitrogen atoms during the acylation and/or condensation polymerization reaction.

The heterocyclic organic base compound containing two or more nitrogen atoms herein includes for example, imidazole compounds, triazole compounds, dipyridyl compounds, phenanthroline compounds, diazaphenanthrene compounds, 1,5-diazabicyclo[4.3.0]non-5-ene, 1,4-diazabicyclo[2.2.2]octane, 1,8-diazabicyclo[5.4.0] unde-7-cene, N,N-dimethylaminopyridine and the like.

The imidazole compound includes for example, imidazole compounds represented by the following formula (II)

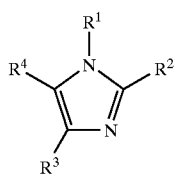

(II)

wherein $R^1$, $R^2$, $R^3$ and $R^4$ each independently represents hydrogen atom, alkyl group having about 1 to 4 carbon atoms, hydroxymethyl group, cyano group, cyanoalkyl group having about 1 to 4 carbon atoms, cyanoalkoxy group having about 1 to 4 carbon atoms, carboxyl group, amino group, aminoalkyl group having about 1 to 4 carbon atoms, aminoalkoxy group having about 1 to 4 carbon atoms, phenyl group, benzyl group, phenylpropyl group, formyl group or the like.

Specific examples of the imidazole compound include for example, imidazole, 1-methylimidazole, 2-methylimidazole, 4-methylimidazole, 1-ethylimidazole, 2-ethylimidazole, 4-ethylimidazole, 1,2-dimethylimidazole, 1,4-dimethylimidazole, 2,4-dimethylimidazole, 1-methyl-2-ethylimidazole, 1-methyl-4ethylimidazole, 1-ethyl-2-methylimidazole, 1-ethyl-2-ethylimidazole, 1-ethyl-2-phenylimidazole, 2-ethyl-4-methylimidazole, 2-phenylimidazole, 2-undecylimidazole, 2-heptadecylimidazole, 1-benzyl-2-methylimidazole, 2-phenyl-4-methylimidazole, 1-cyanoethyl-2-meithylimidazole, 1-cyanoethyl-2-phenylimidazole, 4-cyanoethyl-2-ethyl-4-methylimidazole, 1-aminoethyl-2-methylimidazole, 1-(cyanoethylaminoethyl)-2-methylimidazole, N-[2-(2-methyl-1-imidazolyl)ethyl]urea, 1-cyanoethyl-2-undecylimidazole, 1-cyanoethyl-2-methylimidazoletrimelitate, 1-cyanoethyl-2-phenylimidazoletrimelitate, 1-cyanoethyl-2-ethyl4-methylimidazoletrimelitate, 1-cyanoethyl-2-undecylimidazoletrimelitate, 2,4-diamino-6-[2'-methylimidazolyl-(1')]-ethyl-S-triazine, 2,4-diamino-6-[2'-undecylimidazolyl(-(1'))-ethyl-S-triazine], 2,4-diamino-6-[2-ethyl-4-methylimidazolyl-(1')]-ethyl-S-triazine, 1-dodecyl-2-methyl-3-benzylimidazolium chloride, N,N'-bis(2-methyl-1-imidazolylethyl)urea, N,N'-(2-methyl-1-imidazolylethyl)adipoamide, 2,4-dialkylimidazole-dithiocarboxylic acid, 1,3-dibenzyl-2-methylimidazolium chloride, 2-phenyl-4-methyl-5-hydroxymethylimidazole, 2-phenyl-4,5-dihydroxymethylimidazole, 1-cyanoethyl-2-phenyl-4,5-bis(cyanoethoxymethyl)imidazole, 2-methylimidazole isocyanuric acid adduct, 2-phenylimidazole•isocyanuric acid adduct, 2,4-diamino-6-[2'-methylimidazolyl-(1')]-ethyl-S-triazine•isocyanuric acid adduct, 2-alkyl-4-formylimidazole, 2,4-dialkyl-5-formylimidazole, 1-benzyl-2-phenylimidazole, imidazole-4-dithiocarboxylic acid, 2-methylimidazole-4-dithiocarboxylic acid, 2-undecylimidazole-4-dithiocarboxylic acid, 2-heptadecylimidazole-4-dithiocarboxylic acid, 2-phenylimidazole-4-dithiocarboxylic acid, 4-methylimidazole-5-dithiocarboxylic acid, 4-dimethylimidazole-5-dithiocarboxylic acid, 2-ethyl-4-methylimidazole-5-dithiocarboxylic acid, 2-undecyl-4-methylimidazole-5-dithiocarboxylic acid, 2-phenyl-4-methylimidazole-5-dithiocarboxylic acid, 1-aminoethyl-2-methylimidazole, 1-(cyanoethylaminoethyl)-2-methylimidazole, N-(2-methylimidazolyl-1-ethyl)urea, N,N'-(2-methylimidazolyl (1)-ethyl)-adipoyldiamide, 1-aminoethyl-2-ethylimidazole, 4-formylimidazole, 2-methyl-4-formylimidazole, 4-methyl-5-formylimidazole, 2-ethyl-4-methyl-5-formylimidazole, 2-phenyl-4-methyl-4-formylimidazole and the like.

The triazole compound includes for example, 1,2,4-triazole, 1,2,3-triazole, benzotriazole and the like.

The dipyridyl compound includes for example, 2,2'-dipyridyl, 4,4'-dipyridyl and the like.

The phenanthroline compound includes for example, pyrimidine, purine, 1,7-phenanthroline, 1,10-phenanthroline and the like.

The diazaphenanthrene compound includes for example, pyridazine, triazine, pyrazine, 1,8-diazaphenanthrene and the like.

Among them, the imidazole compound represented by the general formula (I) is preferred, and the imidazole compound represented by the general formula (I), wherein $R^1$ is an alkyl group having 1 to 4 carbon atoms and each of $R^2$ and $R^3$ is hydrogen atoms, is particularly preferred in light of a color tone, and moreover, 1-methylimidazole and 1-ethylimidazole are most preferred on behalf of their ready availability.

The content of the heterocyclic organic base compound is usually from about 0.001 to about 1 part by weight per 100 parts by weight of UNITS (1–4) in total which constitute the present polyester, and is preferably from 0.05 to 0.5 part by weight in light of color tone and productivity.

When the amount to be used is 0.001 part by weight or greater, the impact strength tends to be improved, and when it is 1.0 part by weight or less, to control the end point of the reaction tends to become easier.

The heterocyclic organic base compound containing two or more nitrogen atoms may render present for a period of time during the acylation or condensation polymerization reaction, or during the acylation and condensation polymerization reaction. Specific time period for adding the compound may include for example, prior to the acylation reaction, during the acylation reaction, after the acylation reaction and prior to the condensation polymerization reaction, during the condensation polymerization reaction, and the like.

Next, the process for the production of the present polyester is explained in detail with references to the specific examples.

In the acylation reaction, parahydroxybenzoic acid and hydroquinone are first mixed with the fatty acid anhydride. For the purpose of simplification, it is preferred that terephthalic acid and 2,6-naphthalenedicarboxylic acid that are monomers of UNIT (3) and UNIT (4) having a carboxyl group can be concurrently mixed therewith. Then, stirring is conducted under nitrogen atmosphere usually at about 130 to about 160° C. for 10 minutes to 30 hours, preferably at about 140 to about 160° C. to obtain acylation product.

Then, the present polyester can be obtained by the condensation polymerization of the acylation products derived from parahydroxybenzoic acid and hydroquinone with terephthalic acid and 2,6-naphthalenedicarboxylic acid, and fatty acid is generated as by-product.

The condensation polymerization reaction is usually conducted at a temperature in the range of from about 130 to about 400° C. while raising the temperature at a rate of from about 0.1 to 50° C./min. It is more preferred that the reaction is conducted preferably at a temperature in the range of from about 150 to about 350° C. while raising the temperature at a rate of from about 0.3 to about 5° C./min.

Upon the condensation polymerization reaction of the acylation products derived from parahydroxybenzoic acid and hydroquinone with terephthalic acid and 2,6-naphthalenedicarboxylic acid, the generated by-product fatty acid and unreacted fatty acid anhydride are usually evaporated and distilled out from the system in order to shift the equilibrium.

In addition, by refluxing a part of the fatty acid which was distilled out so that it returns to the reaction vessel, the acylation products, terephthalic acid, 2,6-naphthalenedicarboxylic acid, And the like which evaporate or sublime in association with the fatty acid can also be returned to the reaction vessel.

For the purpose of accelerating the condensation polymerization reaction to increase the polymerization rate, a slight amount of a catalyst may be added as needed as long as object of the present invention is not obstructed. The catalyst which may be added includes for example: germanium compounds such as germanium oxide and the like; tin compounds such as stannous oxalate, stannous acetate, dialkyl tin oxides, diaryl tin oxides and the like; titanium compounds such as titanium dioxide, titanium alkoxide, alkoxy titanium silicates and the like; antimony compounds such as antimony trioxide and the like; metal salts of an organic acid such as sodium acetate, potassium acetate, calcium acetate, zinc acetate, ferrous acetate and the like; Lewis acids such as boron trifluoride, aluminum chloride and the like; amines; amides; inorganic acids such as hydrochloric acid, sulfuric acid and the like.

For the acylation reaction and the condensation polymerization reaction, a batch apparatus or the like can be used equipped with a stirring apparatus such as anchor blade, Faudler blade, comb-shaped agitating blade and the like.

It is recommended that thus resulting aromatic polyester is further subjected to solid phase polymerization to obtain the present polyester (2). A process for the solid phase polymerization may include for example, a process in which the aromatic polyester obtained by the condensation polymerization reaction is cooled and ground, and thereafter heated usually to about 230° C.–370° C. as is in a solid state, and the like. The solid phase polymerization is usually conducted under the reduced pressure or under an inert gas atmosphere such as nitrogen gas and the like.

By regulating the reaction temperature and the reaction time in the condensation polymerization reaction and the solid phase polymerization as well as distillation rate of the by-product fatty acid and the like generated in the condensation polymerization reaction and the like, flow beginning temperature of the resulting aromatic polyester can be controlled. For example, when the reaction time in the solid phase polymerization is shortened, aromatic polyester having low flow beginning temperature can be obtained. When the reaction time in the solid phase polymerization is prolonged, aromatic polyester having high flow beginning temperature can be obtained.

The flow beginning temperature of the present polyester (2) is usually from about 250 to about 400° C., and particularly preferably from about 270 to about 370° C.

The flow beginning temperature herein refers to a temperature at which the melting viscosity of the polyester indicates 4800 Pa·s (48000 poise) when it is extruded from a nozzle at a temperature elevation rate of 4° C./minute under load of 9.8 MPa (100 kg/cm$^2$), using a capillary type rheometer equipped with a die having the inner diameter of 1 mm and the length of 10 mm.

Weight-average molecular weigh of the present polyester (2) is usually from about 10000 to about 50000.

The molded article according to the present invention can be obtained in general, by blending the present polyester (2) with filler and the like as needed, followed by molding.

Examples of the filler includes glass fiber such as milled glass fiber, chopped glass fiber and the like; inorganic fillers such as glass beads, hollow glass bulbs, glass powder, mica, talc, clay, silica, alumina, potassium titanate, wollastonite, calcium carbonate (heavy, light, colloidal and the like), magnesium carbonate, basic magnesium carbonate, sodium sulfate, calcium sulfate, barium sulfate, calcium sulfite, aluminum hydroxide, magnesium hydroxide, calcium hydroxide, calcium silicate, silica sand, silica rock, quartz, titanium oxide, zinc oxide, iron oxide graphite, molybdenum, asbestos, silica alumina fiber, alumina fiber, gypsum fiber, carbon fiber, carbon black, white carbon, diatomaceous earth, bentonite, sericite, white sand, black lead and the like; metal or nonmetal whisker such as potassium titanate whisker, alumina whisker, aluminum borate whisker, silicon carbide whisker, silicon nitride whisker and the like; and the like. Among them, glass fiber, glass powder, mica, talc, carbon fiber and the like are suitable.

Two or more of the fillers described above may be used in the molded article according to the present invention. Further, the amount of the filler to be blended in the molded article is usually about 400 parts by weight or less, preferably from about 10 to 400 parts by weight, and more preferably from about 10 to 250 parts by weight per 100 parts by weight of the present polyester (2).

The filler may be those subjected to surface treatment. Methods for the surface treatment include for example, a method in which a surface treatment agent is adsorbed to the filler surface, a method in which a surface treatment agent is added when the present polyester (2) and the filler are kneaded, and the like.

Examples of the surface treatment agent include reactive coupling agents such as silane coupling agents, titanate coupling agents, borane coupling agents and the like; lubricants such as higher fatty acids, higher fatty acid esters, metal salts of higher fatty acid, fluorocarbon surfactants and the like.

The molded article according to the present invention may contain additives, thermoplastic resin and the like. Examples of the additive include: mold release-improving agents such as fluorine resins, metal soaps and the like; nucleating agents; antioxidants; stabilizers; plasticizers; slipping agents; color protection agents; coloring agents; ultraviolet light absorbers; antistatic agents; lubricants; flame retardants; and the like.

Examples of the thermoplastic resin include polycarbonates, polyamides, polysulfones, polyphenylene sulfides, polyphenylene ethers, polyether ketones, polyetherimides and the like.

A process for producing the molded article includes for example: a process in which raw materials involving the present polyester (2), a filler, additives and the like are added to a kneading machine such as single screw extruder, twin-screw extruder, Banbury mixer, roller, Brabender, kneader and the like, followed by melting and kneading, and then the materials are supplied to a molding machine such as extrusion molding machine, injection molding machine, compression molding machine, blow molding machine and the like to execute molding; a process in which the raw materials are previously admixed using mortar, Henschel mixer, ball mill, ribbon blender or the like, and thereafter, the addition, melting and kneading, and molding in a similar manner to those as described above is carried out; a process in which the raw materials are added to a reaction vessel followed by mixing; a process in which the raw materials are supplied into a molding machine, and then molded along with melting and mixing; and the like.

The molded articles according to the present invention can be molded into those having various types of shapes such as fibers, films and the like. Moreover, as they are excellent in formability, mechanical properties, electrical properties, chemical resistance, heat resistance, oil resistance and impact resistance, they can be used for, for example, machine parts such as cog wheels, gears, bearings, motor accessories and the like; electric and electronic parts such as switches, coil bobbins, relays, connectors, sockets and the like; accessories for office and information equipment such as printers, copying machines, facsimile terminal equipments, video cartridge recorders, video cameras, flexible disk drives, hard disk drives, CD-ROM drives, magnetic optical disk drives and the like; process associated parts for producing semiconductors such as IC trays, wafer carriers and the like; cooking utensils such as pans for microwave cooking, ovenwares for a bench oven and the like; i.e., large-sized molded articles and molded articles having a complicated shape and the like.

By shaping the molded article of the present invention into film form or sheet form, it can be used for display device parts, electrical insulation films, films for a flexible circuit board, packaging films, films for recording medium and the like.

Additionally, the molded article shaped into fibrous form such as continuous fiber, short fiber, pulp and the like can be used for clothing materials, heat resistant thermal insulating materials, reinforcing materials for FRP, rubber reinforcing materials, ropes, cables, nonwoven fabrics and the like.

The present invention is hereinafter explained by way of Examples, however, the present invention is not limited by the Examples.

EXAMPLE 1

<Acylation Reaction>

Into a polymerization chamber replaced with nitrogen, were added 835.63 g of parahydroxybenzoic acid ((M1), 6.05 mol), 272.52 g of hydroquinone ((M2), 2.475 mol), 123.35 g of terephthalic acid ((M3), 0.742 mol), 374.55 g of 2,6-naphthalenedicarboxylic acid ((M4), 1.733 mol), 1349.55 g of acetic anhydride (13.22 mol) and 0.163 g of 1-methylimidazole as a heterocyclic organic base compound. After the mixture was stirred at room temperature for 15 minutes, the temperature thereof was elevated with stirring. When the inner temperature became 145° C., stirring was continued for 30 minutes while the same temperature was kept.

<Condensation Polymerization Reaction>

Next, under a similar nitrogen atmosphere, the temperature of the mixture was elevated from 145° C. to 310° C. over 3 hours while distilling out the distilled by-product acetic acid and unreacted acetic anhydride. Thereafter, 1.426 g of 1-methylimidazole (hereinafter referred to as MI) was further added thereto, and yielded an aromatic polyester after stirring the mixture at the same temperature for 1 hour. Thus resulting aromatic polyester was cooled to room temperature, ground with a grinding machine to give aromatic polyester powder (particle diameter being about 0.1 mm–about 1 mm).

<Solid Phase Polymerization>

After the temperature of the powder obtained as described above was elevated under a nitrogen atmosphere from 25° C. to 250° C. over 1 hour, it was further elevated from the same temperature to 301° C. over 8 hours. Then, the powder was kept at the same temperature for 5 hours to complete the solid phase polymerization. Thereafter, the powder post solid phase polymerization was cooled, and the powder post cooling (aromatic polyester) was subjected to measurement of the flow beginning temperature using a flow tester (manufactured by Shimadzu Corporation, "CFT-500 type"), which gave the result of being 323° C.

<Production Example of a Molded Article 1>

To the resultant aromatic polyester, was blended milled glass at 40% by weight, and thereafter, the mixture was granulated at 350° C. using a twin-screw extruder Thus resulting pellet was subjected to injection molding using an injection molding machine at the cylinder temperature of 350° C. and at the mold temperature of 130° C. The resulting molded article was subjected to measurement of the flow beginning temperature in a similar manner described above, accompanied by measurement of the tensile strength, impact strength and deflection temperature under load as shown below. The results are summarized in Table 1.

(1) Tensile Strength

Tensile strength was measured in accordance with ASTM D638 using an ASTM4 dumbbell.

(2) Impact Strength

Impact strength was measured using a test article (without a notch) of 6.4×12.7×64 mm in accordance with ASTM D256.

(3) Deflection Temperature Under Load

A deflection temperature under load was measured in accordance with ASTM D648 at 1.82 MPa (18.6 kg/cm² load) using a test article having length of 127 mm, width of 12.7 mm and thickness of 6.4 mm.

EXAMPLE 2–5 Comparative Examples 1–2

In Examples 2–5, monomers (M1)–(M4), acetic anhydride and MI at a weight illustrated in Table 1 were mixed, and the acylation reaction and condensation polymerization reaction was carried out in accordance with Example 1. Then, the solid phase polymerization was carried out until the reaction mixture reaches to the temperature (referred to as solid phase polymerization temperature) described in Table 1.

In Comparative Example 1–2, similar operation to Example 1 was conducted except that MI was not added and that the solid phase polymerization temperature was changed.

The results are summarized in Table 1 together with the molar ratio of (M1) per total moles of the monomers converted to 100, and the molar ratio of (M3) and (M4) represented by the formula (I) described above,

TABLE 1-2

|  |  | Comparative example | |
|---|---|---|---|
|  |  | 1 | 2 |
| Amount charged (g) | (M1) | 835.6 | 911.6 |
|  | [mol %] | [55] | [60] |
|  | (M2) | 272.5 | 242.2 |
|  | [mol %] | [22.5] | [20.0] |
|  | (M3) | 123.4 | 91.37 |
|  | [mol %] | [6.75] | [5.0] |
|  | (4) | 374.6 | 356.7 |
|  | [mol %] | [15.75] | [15.0] |
|  | MI | None | None |
| Monomer charging ratio | (M3)/[(M3) + (M4)] | 0.30 | 0.25 |
| Solid phase polymerization temperature [° C.] | | 303 | 304 |
| Aromatic polyester | Flow beginning temperature [° C.] | 322 | 323 |
| Molded article | Flow beginning temperature [° C.]# | 306 | 306 |
|  | Tensile strength [MPa] | 148 | 142 |
|  | Tensile elongation [%] | 9.8 | 9.7 |
|  | Flexural strength [MPa] | 142 | 142 |
|  | Impact strength [J/m] | 390 | 410 |
|  | Deflection temperature under load [° C.] | 282 | 284 |

(M1): 4-hydroxybenzoic acid
(M2): hydroquinone
(M3): terephthalic acid
(M4): 2,6-naphthalenedicarboxylic acid
MI: 1-methylimidazole
(I): a value represented by: [(M3)]/{[(M3)] + [(M4)]}   (mol %)
wherein [(M3)] and [(M4)] represent number of moles of terephthalic acid (M3) and 2,6-naphthalenedicarboxylic acid unit (4)
a value measured with a pellet (molded article) obtained by granulation.

Accordingly, the aromatic polyester of the present invention, which is an aromatic polyester obtained from

TABLE 1-1

|  |  | Example | | | | |
|---|---|---|---|---|---|---|
|  |  | 1 | 2 | 3 | 4 | 5 |
| Amount charged (g) | (M1) | 835.6 | 835.6 | 911.6 | 873.6 | 911.6 |
|  | [mol %] | [55] | [55] | [60] | [57.5] | [60] |
|  | (M2) | 272.5 | 272.5 | 242.2 | 257.4 | 242.2 |
|  | [mol %] | [22.5] | [22.5] | [20.0] | [21.25] | [20.0] |
|  | (M3) | 123.4 | 102.8 | 109.7 | 106.8 | 91.37 |
|  | [mol %] | [6.75] | [5.62] | [6.0] | [5.84] | [5.0] |
|  | (M4) | 374.6 | 401.3 | 332.9 | 366.4 | 356.7 |
|  | [mol %] | [15.75] | [16.88] | [14.0] | [15.41] | [15.0] |
|  | MI | 1.43 | 1.43 | 1.41 | 1.42 | 1.42 |
| Monomer charging ratio | (M3)/[(M3) + (M4)] | 0.30 | 0.25 | 0.30 | 0.275 | 0.25 |
| Solid phase polymerization temperature [° C.] | | 296 | 301 | 292 | 296 | 296 |
| Aromatic poly-ester | Flow beginning temperature [° C.] | 323 | 321 | 329 | 322 | 321 |
| Molded article | Flow beginning temperature [° C.]# | 307 | 304 | 312 | 305 | 306 |
|  | Tensile strength [MPa] | 152 | 153 | 152 | 150 | 143 |
|  | Tensile elongation [%] | 10.7 | 11 | 10.2 | 10.6 | 9.9 |
|  | Flexural strength [MPa] | 142 | 142 | 148 | 145 | 147 |
|  | Impact strength [J/m] | 445 | 468 | 544 | 555 | 596 |
|  | Deflection temperature under load [° C.] | 287 | 286 | 292 | 286 | 286 | parahydroxybenzoic acid, hydroquinone, terephthalic acid and 2,6-naphthalenedicarboxylic acid as monomers, has a low melting point leading to excellent processing characteristics. Moreover, the molded article obtained from the aromatic polyester is excellent in mechanical strength such as tensile strength, flexure strength and the like, with excellent heat resistance such as heat distortion temperature, and is also excellent in impact strength.

What is claimed is:

1. An aromatic polyester which is obtained by condensation polymerization reaction of terephthalic acid, 2,6-naphthalenedicarboxylic acid and acylated product obtained by acylation of parahydroxybenzoic acid and hydroquinone with fatty acid anhydride, wherein said aromatic polyester satisfy the following conditions (A) to (D), and the acylation and/or the condensation polymerization reaction are conducted in the presence of heterocyclic organic compound containing at least two nitrogen atoms:

(A): Number of moles of a monomer unit derived from parahydroxybenzoic acid (UNIT (1)) is 54–62 moles per 100 moles of UNIT (1), a monomer unit derived from hydroquinone (UNIT (2)), a monomer unit derived from terephthalic acid (UNIT (3)) and a monomer unit derived from 2,6-naphthalenedicarboxylic acid (UNIT (4)) in total;

(B): Number of moles of UNIT (2) is 19–23 moles per 100 moles of UNIT (1), UNIT (2), UNIT (3) and UNIT (4) in total;

(C): The molar ratio of UNIT (3) and UNIT (4), which is represented by the following formula (I) is 0.23–0.35:

$$[(3)]/\{[(3)]+[(4)]\} \quad (I)$$

wherein [(3)] and [(4)] represent number of moles of respective UNIT (3) and UNIT (4);

(D): Total number of moles of UNIT (3) and UNIT (4) is 0.95–1.05 moles per one mole of UNIT (2).

2. The aromatic polyester according to claim 1 wherein said heterocyclic organic base compound is imidazole compound represented by the general formula

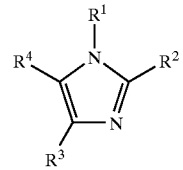

wherein $R^1$, $R^2$, $R^3$ and $R^4$ each independently represents hydrogen atom, alkyl group having 1 to 4 carbon atoms, hydroxymethyl group, cyano group, cyanoalkyl group having 1 to 4 carbon atoms, cyanoalkoxy group having 1 to 4 carbon atoms, carboxyl group, amino group, aminoalkyl group having 1 to 4 carbon atoms, aminoalkoxy group having 1 to 4 carbon atoms, phenyl group, benzyl group, phenylpropyl group or formyl group.

3. The aromatic polyester according to claim 1 wherein the amount of said heterocyclic organic base compound added is from 0.001 to 1 part by weight per 100 parts by weight of UNIT (1), UNIT (2), UNIT (3) and UNIT (4) in total.

4. An aromatic polyester obtained by solid phase polymerization of the aromatic polyester according to claim 1.

5. A molded article obtained by molding a composition comprising the aromatic polyester according to claim 4.

6. The molded article according to claim 5 which further comprising filler and the filter content is 10–400 parts by weight per 100 parts by weight of the aromatic polyester.

* * * * *